Patented Dec. 29, 1936

2,066,295

UNITED STATES PATENT OFFICE 2,066,295

MOISTURE RESISTING COMPOSITION FOR WOOD AND THE LIKE

Frank H. Lyons, Milwaukee, Wis., assignor to E. L. Bruce Company, Memphis, Tenn., a corporation of Delaware No Drawing. Application June 8, 1931, Serial No. 543,020

7 Claims. (Cl. 134—26)

My invention relates to a composition of matter that is to be used for impregnating wood and the like to increase its resistance to moisture absorption. The composition is of particular utility in connection with the treatment of wood flooring to prevent it from cupping or warping in use. It is customary to subject the flooring to a finishing coat after treatment with the moisture resisting composition and accordingly the coating that is produced by the use of my composition must be such as that it can be finished over readily.

A formula that I have found to be suitable for the purpose is as follows:

| | | |
|---|---|---|
| Linseed oil | gallons | 313 |
| China-wood oil | do | 94 |
| Solution containing 60% of limed rosin and 40% varnish makers and painters' naphtha | do | 130 |
| Paraffin wax | pounds | 724 |
| Zinc stearate | do | 50 |
| Varnish makers and painters' naphtha | gallons | 365 |

Linseed oil when it dries out forms a skin which when it is examined under the microscope shows numerous pores through which moisture can penetrate. The reason for the formation of the pores probably lies in the fact that the drying of the linseed oil is due primarily to oxidation. Some of the oxidation products are volatile and leave pores in the skin when they evaporate.

China-wood oil, on the other hand, dries mainly by polymerization and shows but few pores. A combination of linseed oil and China-wood oil produces a skin that is much less porous than the linseed oil used alone and hence is more resistant to moisture penetration.

I have discovered that the pores in these skins can be further reduced by the use of zinc stearate, which is slightly soluble in linseed oil and considerably more soluble in China-wood oil and soluble to more than 10% in a solution of limed rosin in naphtha, at about 155° F. As the skin of linseed oil and China-wood oil forms, the zinc stearate begins to crystallize and the fine pores in the skin are closed with crystals of zinc stearate. The fine crystals strengthen the skin and close the pores due to the growth of the crystals as they form. Zinc stearate also acts as an oxygen carrier into the linseed oil and thus accelerates the solidification or drying of the skin.

When a piece of wood is impregnated with a moisture resisting composition, the composition passes through both the cells of the wood and the distribution channels. Since the cells and channels are very small it is difficult to carry any solid matter into the same and which might aid in increasing the moisture resistance. Inasmuch as my impregnating composition is applied while the zinc stearate is in solution, it will be clear that when the skin forms in the cells and channels that the pores of the skin can be closed by the crystals which form in situ.

Paraffin wax is one of the best moisture resistant compounds. If it could be used alone, no other ingredients except a solvent would be necessary. However, it is impossible to finish over paraffin wax with the customary varnishes, lacquers, etc. Even when paraffin wax is dissolved in linseed oil, it is difficult to properly finish over. When the paraffin wax is dissolved in a solvent together with the skin forming oils, the wax will be deposited first and on top will be the substantially pore proof skin and which can be finished over and not affected by the usual varnishes, lacquers, etc.

The paraffin wax, however, usually crystallizes in needle crystals and does not give under these conditions good moisture proofing. In order to produce an amorphous wax, a solution of limed rosin in varnish makers and painters' naphtha is added containing 60% limed rosin and 40% varnish makers and painters' naphtha. The gum like characteristics of the rosin prevents the crystallization of the wax and produces a substantially continuous amorphous film. A better moisture resistant coating can be obtained with the wax in a non-crystalline state than where there are crystals between which there may be openings for passage of moisture.

Other waxes than a paraffin wax may be used including particularly Japan wax and ceresin wax. If the wax is appreciably in excess of 11% of the composition, the resulting skin becomes incompatible with the finishes such as varnishes, lacquers, etc., applied over the wood.

An examination under the microscope of linseed oil and China-wood oil skins shows that the latter is much less porous than the former. Up to 25 parts of China-wood oil to 75 parts of linseed oil is found to be the best ratio of these oils and shows the highest moisture resistance efficiency.

Other gums may be substituted for rosin such as kauri, congo, damar and zanzibar gums. Damar gum in the formulation particularly gives a high moisture resisting skin.

Other solvents may be used in place of varnish makers and painters' naphtha such as oleum spirits, benzol, toluol, xylol, turpentine, etc.

Other oils may be used in place of linseed and China-wood oils such as the drying oils and so-called semi-drying oils. In place of zinc stearate, aluminum oleate, lead stearate, lead oleate, zinc palmitate may be also used.

From the above description it will be seen that my composition contains a skin forming oil, such as linseed and China-wood oil; a moisture resisting material such as paraffin wax and a gum; a salt which goes into solution and by crystallization makes a poreless film; and a volatile solvent for the above materials which will penetrate the wood.

In view of the fact that the wax is underneath the film, when the finish is thereafter applied, proper adhesion of the finish is obtained. The film and the wax present a plastic mass of high moisture resistance that can be finished over.

What I claim is:

1. A moisture resisting composition in substantially the following proportions:

Linseed oil _____ gallons__ 313
China-wood oil _____ do____ 94
Solution containing 60% limed rosin and 40% varnish makers and painters' naphtha _____ gallons__ 130
Paraffin wax _____ pounds__ 724
Zinc stearate _____ do____ 50
Varnish makers and painters' naphtha _____ gallons__ 365

2. A moisture resisting composition for treating wood and the like comprising as a base and principal ingredient linseed oil and China-wood oil in such proportions as to normally produce a tough porous skin, when dry, a wax to increase the moisture resistance of the skin, a resin to produce an amorphous condition of the wax in the skin, zinc stearate in such proportions as to close the pores in the skin when it crystallizes out of solution and a volatile solvent, all the ingredients of the composition being in solution at the treating temperature.

3. A moisture resisting composition for treating wood and the like comprising as a base and principal ingredient linseed oil which normally forms a porous skin, when dry, a wax to increase the moisture resistance of the skin, a resin to prevent crystallization of the wax and produce a substantially continuous amorphous skin in the coated object, a volatile solvent and a metallic salt of a fatty acid, in an amount sufficient to crystallize and fill the pores in the skin, when dry, all the ingredients of the composition being in solution at the treating temperature.

4. A composition for treating wood and the like to increase its resistance to moisture comprising a solution containing as a base and principal ingredient, linseed oil which normally forms a porous skin in the cells and channels of the wood, when dry, a metallic salt of a fatty acid, selected from the group consisting of zinc stearate, aluminum oleate, lead stearate, lead oleate and zinc palmitate, dissolved in the oil, which on drying, crystallizes out of the solution, the pores in the skin being closed by the salt crystals to thereby increase the moisture resistance of the skin, all the ingredients of the composition being in solution.

5. A process for increasing the resistance to moisture of wood and the like by impregnation, comprising treating the wood with a solution containing as a base and principal ingredients, linseed oil and China-wood oil which normally form a porous skin in the cells and channels of the wood when dry, a metallic salt of a fatty acid, selected from the group consisting of zinc stearate, aluminum oleate, lead stearate, lead oleate and zinc palmitate, dissolved in the oil, which on drying, crystallizes out of the solution, the pores in the skin being closed by the salt crystals to thereby increase the moisture resistance of the skin, all the ingredients of the composition being in solution.

6. A process for increasing the resistance to moisture of wood and the like by impregnation, comprising treating the wood with a solution containing as a base and principal ingredient, a drying oil mixture including linseed oil, which forms a porous skin in the cells and channels of the wood, a water insoluble salt dissolved in the solution, drying and crystallizing the salt out of the solution, whereby the pores in the skin are closed by the salt crystals to thereby increase the moisture resistance of the skin.

7. A moisture resisting composition for treating wood and the like comprising as a base and principal ingredient linseed oil which normally forms a porous skin, when dry, a wax to increase the moisture resistance of the skin, a volatile solvent and a metallic salt of a fatty acid in an amount sufficient to crystallize and fill the pores in the skin, when dry, all the ingredients of the composition being in solution at the treating temperature.

FRANK H. LYONS.